United States Patent
Komine

(10) Patent No.: US 8,010,661 B2
(45) Date of Patent: Aug. 30, 2011

(54) METHOD FOR EXECUTING DISCOVERY AND STATUS UPDATE POLLING PROCEDURES OF NETWORKED DEVICES

(75) Inventor: Naoki Komine, Hawthorne, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 238 days.

(21) Appl. No.: 12/338,968

(22) Filed: Dec. 18, 2008

(65) Prior Publication Data

US 2010/0161832 A1    Jun. 24, 2010

(51) Int. Cl.
*G06F 15/173* (2006.01)
*G06F 3/00* (2006.01)

(52) U.S. Cl. .......... 709/224; 710/6; 710/8; 710/17

(58) Field of Classification Search .......... None
See application file for complete search history.

(56) References Cited

U.S. PATENT DOCUMENTS

| | | | | |
|---|---|---|---|---|
| 5,852,744 | A * | 12/1998 | Agatone et al. | 710/17 |
| 6,343,320 | B1 * | 1/2002 | Fairchild et al. | 709/224 |
| 6,975,963 | B2 | 12/2005 | Hamilton et al. | 702/182 |
| 7,219,300 | B2 | 5/2007 | Arquie et al. | 715/736 |
| 7,433,935 | B1 * | 10/2008 | Obert | 709/219 |
| 7,738,455 | B2 * | 6/2010 | Keshavarzian et al. | 370/390 |
| 2002/0184528 | A1 | 12/2002 | Shevenell et al. | 726/6 |
| 2003/0018930 | A1 * | 1/2003 | Mora et al. | 714/42 |
| 2004/0061701 | A1 | 4/2004 | Arquie et al. | 345/440 |
| 2004/0064293 | A1 | 4/2004 | Hamilton et al. | 702/182 |
| 2004/0208144 | A1 * | 10/2004 | Vinayakray-Jani | 370/331 |
| 2007/0214412 | A1 | 9/2007 | Arquie et al. | 715/210 |
| 2008/0192667 | A1 * | 8/2008 | Wandel | 370/311 |
| 2010/0103824 | A1 * | 4/2010 | Gilmour | 370/245 |

OTHER PUBLICATIONS

'The Essentials of Computer Organization and Architecture' by Linda Null et al., copyright 2006 by Jones and Bartlett Publishers, Inc.*

'Adaptive Broadcast for Travel and Traffic Information Distribution Based on Inter-Vehicle Communication' by Wischhof et al., copyright 2003.*

* cited by examiner

*Primary Examiner* — Henry W Tsai
*Assistant Examiner* — Steven G Snyder
(74) *Attorney, Agent, or Firm* — Chen Yoshimura LLP

(57) ABSTRACT

In a system of networked devices such as printers managed by a computer connected to them by a network, a method is described for executing device discovery and device status update at independent time intervals using a SNMP broadcast method while eliminating thread safety risk. Device discovery and status update are executed as subroutines within a main routine and each subroutine has its own decrement counter. The entire routine is repeated one cycle every time unit. In each cycle, the decrement counters are evaluated. If a counter is a positive value, the corresponding subroutine is skipped and the counter is decremented by one. If a counter is zero, the corresponding subroutine is executed and its counter is reset to the user-specified time interval afterwards.

12 Claims, 2 Drawing Sheets

METHOD FOR EXECUTING DISCOVERY AND STATUS UPDATE POLLING PROCEDURES OF NETWORKED DEVICES

BACKGROUND OF THE INVENTION

1. Field of the Invention

This invention relates to a method for managing networked devices such as printers, and in particular, it relates to a method for device discovery and device status update polling.

2. Description of Related Art

In a networked system where a number of devices such as printers are managed by a computer connected to the printers via a network such as LAN, WAN, etc., the computer periodically performs printer discovery and printer status update functions. Printer discovery is carried out to discover all printers on the network that are supported by the computer; printer status update is carried out to monitor the status and health of the already discovered printers. Printer status update involves sending status information queries to printers to gather information such as device status, consumable resource levels, detailed error condition information, etc. Conventional printer discovery and printer status update polling methods use an SNMP (Simple Network Management Protocol) broadcast-based method, where the computer sends a broadcast packet out on the network and waits a fixed amount of time for a response from all devices on a given subnet.

Conventionally, the printer discovery and printer status update polling routines are conducted on the same time interval due to thread safety concerns. In a system where a computer communicates with networked devices using SNMP broadcasts, if two or more separate software functions (routines) attempt to make SNMP calls out onto the network, the computer may be unable to discern which calling function to return the correct response data to. A procedure having such separate functions is considered non-thread-safe. Thus, to ensure thread safety, printer discovery and printer status update functions (which both make SNMP broadcast calls) are performed back-to-back and at the same time interval, so that only one function will be making SNMP calls at a given time.

SUMMARY

The present invention is directed to a method of conducting device discovery and device status update that substantially obviates one or more of the problems due to limitations and disadvantages of the related art.

An object of the present invention is to enable device discovery and device status update to be conducted at different time intervals using a SNMP broadcast method without compromising thread safety.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented on a computer for managing a plurality of devices, the computer being connected to the devices via a network, the method including: (a) evaluating a first time counter; (b) if the first time counter is a first target value, executing a first subroutine and resetting the first time counter to a first reset value, the first subroutine including making SNMP (Simple Network Management Protocol) calls onto the network and receiving responses from one or more of the devices; (c) if the first time counter is one of a first plurality of non-target values, skipping the first subroutine and adjusting the first time counter toward the first target value; (d) evaluating a second time counter; (e) if the second time counter is a second target value, performing a second subroutine and resetting the second time counter to a second reset value, the second subroutine including making SNMP calls onto the network and receiving responses from one or more of the devices; (f) if the second time counter is one of a second plurality of non-target values, skipping the second subroutine and adjusting the second time counter toward the second target value; (g) sleeping for a pre-defined time period; and (h) repeating steps (a) through (g).

In another aspect, the present invention provides a computer program product that causes a computer to perform the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 2:
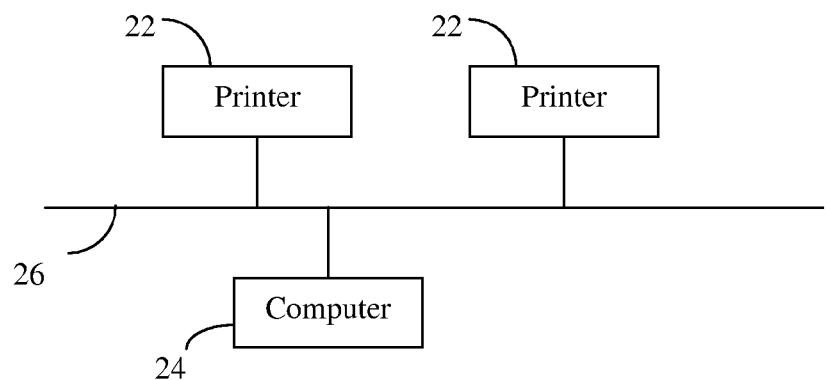
FIG. 2 illustrates an environment in which embodiments of the present invention may be implemented.

FIG. 2 illustrates an exemplary environment in which embodiments of the present invention may be implemented. In this example, a number of printers 22 and a computer (e.g. a print server or any computer that can manage or print to the printers) 24 are connected to each other via a network 26, such as a LAN (local area network), WAN (wide area network), etc. The general structures of the printers and computer are familiar to those skilled in the relevant art. The computer 24 carries out a printer discovery and printer status update process to discover and manage printers 22 on the network 26. While printers are used as an example, the method can be applied to any suitable networked devices, such as data storage devices, networked computers (workstations and/or servers), other network appliances (i.e. network telephony devices, gaming consoles), etc.

The conventional method of conducting printer discovery and printer status update at the same time interval may be inconvenient in many situations. For example, it is often desirable to discover printers less frequently (e.g. every 30 minutes) while requiring printer status information to be polled and updated on a more frequent basis (e.g. every 1 minute). Thus, it is often desirable to conduct printer discovery and printer status update at independent time intervals.

Embodiments of the present invention provides the ability to set the intervals for the printer discovery function and printer status update function independently while eliminating thread-safety concerns. It provides independently settable printer discovery interval (the time period between two successive printer discovery attempts) and printer status update interval (the time period between two successive status information queries to already discovered printers) by making use of decrement counters. For ease of understanding, the above two functions may be considered two distinct subroutines within a single engine.

A time unit which is a common denominator of the time intervals for the two subroutines is pre-determined. In other words, the time intervals for the two functions are both multiples of this time unit. The time unit may be, for example, one minute. The engine is timed to repeat the entire routine one cycle every time unit. For each subroutine, the decision to execute or skip on a given cycle of the routine is made by evaluating its decrement counter. Optionally, each subroutine's decrement counter is initialized with zero as the seed value. This ensures that all subroutines will execute on the first run of the routine. After each subroutine completes their first execution, it resets its own decrement counter to the user-specified time interval.

The decrement counter may measure time either in actual time or in the number of time units. For example, if the time unit is 2 minutes, and the printer discovery routine is set to repeat every 30 minutes, then the printer discovery counter may be reset to 30 minutes initially and is decremented by 2 minutes every cycle; or it may be reset to 15 initially and is decremented by 1 every cycle. The latter is used in the specific example described below, but it should be understood that both can be used to implement the counters.

After the counters are reset, on each cycle of the engine, each counter is decremented by one. The routine evaluate each counter to determine if the counter value has reached zero. If the value is a positive value (greater than zero), the subroutine is skipped and the decrement counter is updated with the new (decremented) value. This process repeats until the decrement counter reaches zero and the corresponding subroutine will execute. By doing so, the engine is able to conduct SNMP requests for printer discovery and printer status updates safely and effectively.

A bypass condition may be implemented in order to handle cases where a user desires a certain subroutine to be completely disabled (i.e. for the printer discovery to be turned off). In this case, the corresponding decrement counter should be set to a negative value (less than zero) so that that subroutine is automatically skipped and the negative counter value remains unchanged.

Figure 1:
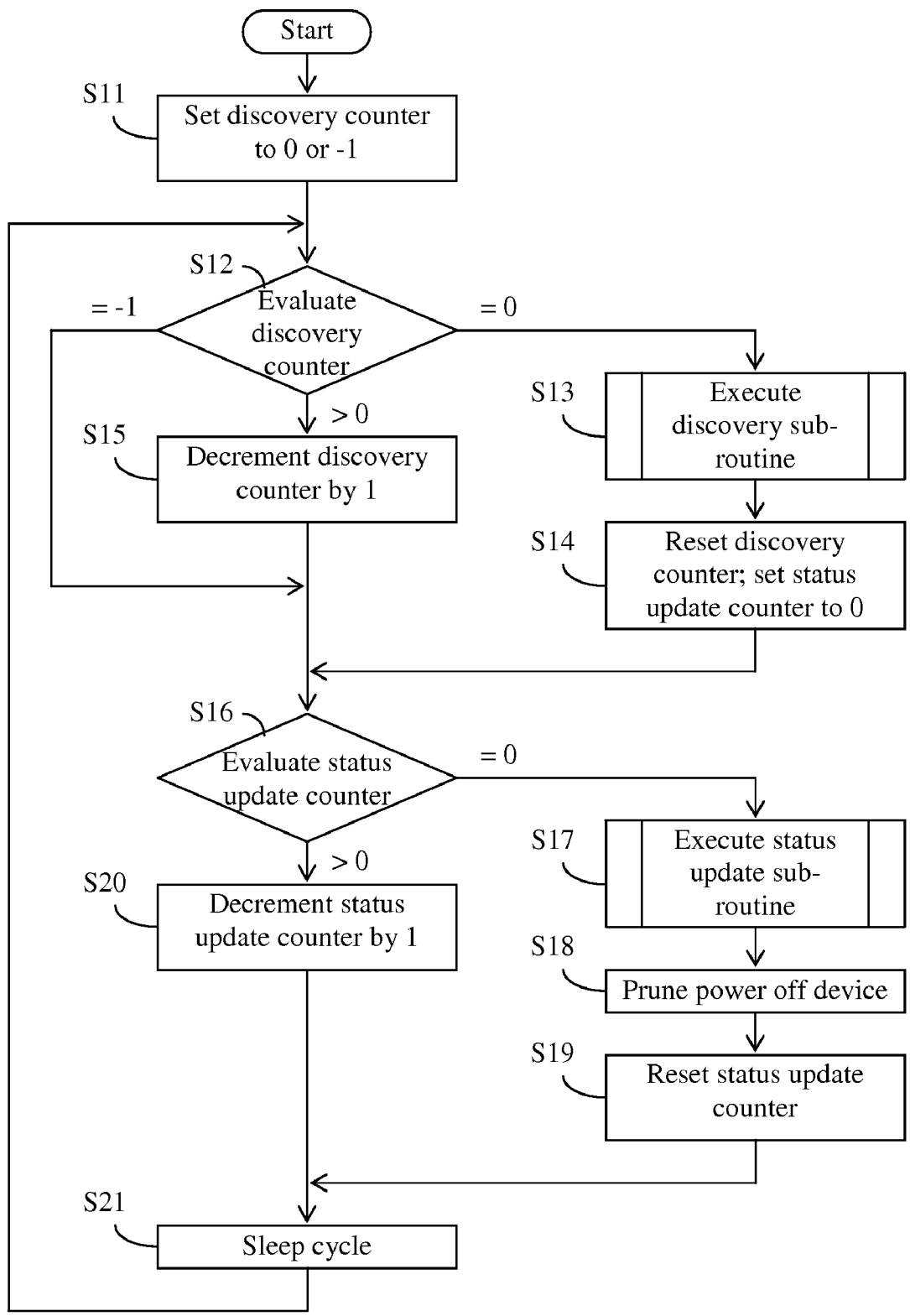
FIG. 1 is a flow chart illustrating a printer discovery and printer status update method according to an embodiment of the present invention.

FIG. 1 is a flow chart illustrating a printer discovery and printer status update process according to an embodiment of the present invention. Prior to starting the routine, the discovery counter reset value (representing the printer discovery time interval) and the status update counter reset value (representing the status update time interval) have been specified, as well as the cycle length (i.e. the length of the time unit). Initially, the printer discovery counter is set to zero or −1 (step S11). Setting it to −1 will effectively turn off the discovery process (i.e. it will always be skipped). Setting the discovery counter to zero in this step ensures that the discovery and status update processes will be executed when the routine first starts.

Then, in each cycle of the routine, the discovery counter is evaluated (step S12). If its value is zero, the printer discovery subroutine is executed (step S13) and the discovery counter is then reset to its reset value (step S14). In addition (optional), the printer status update counter is set to zero printer discovery subroutine is run (step S14). This will cause the status update subroutine to be run immediately after the printer discovery subroutine is run each time.

If in the evaluating step S12 the discovery counter is greater than zero, the printer discovery subroutine is not run (i.e. steps S13 and S14 are skipped) and the discovery counter is decremented by one (step S15). If in step S12 the discovery counter is less than zero, the printer discovery subroutine is skipped and the discovery counter value is unchanged.

Then, the status update counter is evaluated (step S16). If its value is zero, the status update subroutine is executed (step S17) and the status update counter is reset to its reset value (step S19). Optionally, if the status update subroutine detects that some printers have been powered off, they are removed from the discovered printers list (step S18).

If in the evaluating step S16 the printer status update counter value is greater than zero, the printer status update subroutine is not run (i.e. steps S17-S19 are skipped) and the printer status update counter is decremented by one (step S20). After the printer status update subroutine is either run or skipped, the routine enters a sleep cycle for the duration of one time unit (step S21), and then goes back to step S12 to evaluate the printer discovery counter value again.

The details of the printer discovery and printer status update subroutines are not described in detail here as those skilled in the relevant art can readily implement any desired printer discovery and status update procedures.

In addition to the example given above, any suitable model may be used to implement the counters. More generally, each counter has a target value that will trigger the subroutines to be run, an adjustment amount each cycle, and a reset value such that the subroutine will run at the correct pre-specified time interval.

By utilizing a single function/engine approach, the printer discovery and status update polling method described above averts SNMP thread-safety risk while allowing printer discovery and printer status update to run on independent intervals. It uses a simple, straight-forward algorithm, and does not require complex inter-thread messaging or thread monitoring to prevent SNMP collisions Although the example described above executes two subroutines (printer discovery and printer status update), the method can be used to execute more subroutines at different time intervals. Although the example described above focuses on printer discovery and printer status update functions, the method can be used to perform other functions for other networked devices.

It will be apparent to those skilled in the art that various modification and variations can be made in the printer discovery and status update method of the present invention without departing from the spirit or scope of the invention. Thus, it is intended that the present invention cover modifications and variations that come within the scope of the appended claims and their equivalents.

What is claimed is:

1. A method implemented on a computer for managing a plurality of devices, the computer being connected to the devices via a network, the method comprising:
  (a) evaluating a first time counter;
  (b) if the first time counter is a first target value, executing a first subroutine and resetting the first time counter to a first reset value, the first subroutine including making SNMP (Simple Network Management Protocol) calls onto the network and receiving responses from one or more of the devices to gather a first type of information;
  (c) if the first time counter is one of a first plurality of non-target values, skipping the first subroutine and adjusting the first time counter toward the first target value;
  (d) evaluating a second time counter;
  (e) if the second time counter is a second target value, executing a second subroutine and resetting the second time counter to a second reset value, the second subroutine including making SNMP calls onto the network and receiving responses from one or more of the devices to gather a second type of information;

(f) if the second time counter is one of a second plurality of non-target values, skipping the second subroutine and adjusting the second time counter toward the second target value;

(g) sleeping for a pre-defined time period; and (h) repeating steps (a) through (g), wherein each of the first time counter and the second time counter is evaluated once and only once between two consecutive sleeping steps.

2. The method of claim 1, wherein the devices are printers, wherein the first subroutine is a printer discovery subroutine, and wherein the second subroutine is a printer status update subroutine.

3. The method of claim 1, wherein step (b) further comprises setting the second time counter to the second target value.

4. The method of claim 1, further comprising:
(i) if the first time counter is a third value, the third value being different from the first target value and the first plurality of non-target values, skipping the first subroutine without changing the first time counter.

5. The method of claim 4, further comprising, before step (a): setting the first time counter to the third value.

6. The method of claim 1, further comprising, before step (a): setting the first time counter to the first target value.

7. A computer program product comprising a non-transitory computer usable medium having a computer readable program code embedded therein for controlling a computer, the computer being connected to a plurality of devices via a network, the computer readable program code configured to cause the computer to execute a process for managing the plurality of devices, the process comprising:

(a) evaluating a first time counter;

(b) if the first time counter is a first target value, executing a first subroutine and resetting the first time counter to a first reset value, the first subroutine including making SNMP (Simple Network Management Protocol) calls onto the network and receiving responses from one or more of the devices to gather a first type of information;

(c) if the first time counter is one of a first plurality of non-target values, skipping the first subroutine and adjusting the first time counter toward the first target value;

(d) evaluating a second time counter;

(e) if the second time counter is a second target value, executing a second subroutine and resetting the second time counter to a second reset value, the second subroutine including making SNMP calls onto the network and receiving responses from one or more of the devices to gather a second type of information;

(f) if the second time counter is one of a second plurality of non-target values, skipping the second subroutine and adjusting the second time counter toward the second target value;

(g) sleeping for a pre-defined time period; and (h) repeating steps (a) through (g), wherein each of the first time counter and the second time counter is evaluated once and only once between two consecutive sleeping steps.

8. The computer program product of claim 7, wherein the devices are printers, wherein the first subroutine is a printer discovery subroutine, and wherein the second subroutine is a printer status update subroutine.

9. The computer program product of claim 7, wherein step (b) further comprises setting the second time counter to the second target value.

10. The computer program product of claim 7, where the process further comprises:
(i) if the first time counter is a third value, the third value being different from the first target value and the first plurality of non-target values, skipping the first subroutine without changing the first time counter.

11. The computer program product of claim 10, wherein the method further comprises, before step (a): setting the first time counter to the third value.

12. The computer program product of claim 7, wherein the method further comprises, before step (a): setting the first time counter to the first target value.

* * * * *